United States Patent [19]

Sawatsubashi et al.

[11] Patent Number: 5,148,301

[45] Date of Patent: Sep. 15, 1992

[54] LIQUID CRYSTAL DISPLAY DEVICE HAVING A DRIVING CIRCUIT INSIDE THE SEAL BOUNDARY

[75] Inventors: Takeshi Sawatsubashi, Hachioji; Atsushi Mawatari, Hamura; Hiroyuki Okimoto, Hino, all of Japan

[73] Assignee: Casio Computer Co., Ltd., Tokyo, Japan

[21] Appl. No.: 659,749

[22] Filed: Feb. 21, 1991

[30] Foreign Application Priority Data

Feb. 27, 1990 [JP] Japan ................ 2-18227[U]
May 1, 1990 [JP] Japan ................ 2-45085[U]

[51] Int. Cl.$^5$ .................... G02F 1/1337; G02F 1/1339
[52] U.S. Cl. .................................. 359/80; 359/85
[58] Field of Search .................. 359/85, 80, 59, 60

[56] References Cited

U.S. PATENT DOCUMENTS

| | | | |
|---|---|---|---|
| 4,394,067 | 7/1983 | Spruijt et al. | 359/80 X |
| 4,770,501 | 9/1988 | Tamura et al. | 359/56 |
| 4,807,974 | 2/1989 | Hirai | 359/54 X |
| 4,881,797 | 11/1989 | Aoki et al. | 359/67 X |
| 5,066,106 | 11/1991 | Sakamoto et al. | 359/59 |

OTHER PUBLICATIONS

Fujii et al., "Laser-Recrystallization Technique for Silicon-TFT Integrated Circuits on Quartz Substrates and Its applicaton to Small-sized Monolithic Active-Matrix LED's", IEEE Transactions on Electron Devices, vol. 37, No. 1, Jan. 1990, pp. 121-127.

*Primary Examiner*—Stanley D. Miller
*Assistant Examiner*—Ron Trice
*Attorney, Agent, or Firm*—Frishauf, Holtz, Goodman & Woodward

[57] ABSTRACT

A liquid crystal display device comprises first and second substrates disposed to face each other, first and second electrodes formed on the both substrates to opposed to each other and forming a display region, signal leads formed on the second substrate and connected to the second electrodes, a seal surrounding the display region between the substrates and connecting together the substrates, a driving circuit provided between outer edges of the display region and those of the seal and connected to the leads, for generating a driving signal and supplying the signal to the wires in response to externally input display data, and a liquid crystal material sealed in a space surrounded by the substrates and seal.

11 Claims, 7 Drawing Sheets

LIQUID CRYSTAL DISPLAY DEVICE HAVING A DRIVING CIRCUIT INSIDE THE SEAL BOUNDARY

BACKGROUND OF THE INVENTION

1. Field of the Invention

This invention relates to a liquid crystal display device provided with a driving circuit for generating a scanning signal and a data signal on the basis of image data supplied from outside.

2. Description of the Related Art

Since the liquid crystal display devices can be made small in size and thin, they are widely used as display devices for word processors, personal computers, television sets and the like.

The liquid crystal display device is used to be connected to separate driving circuits which generate data signals, scanning signals and the like.

Recently, in order to meet the requirement in which the display device should be further miniaturized, there has been proposed a liquid crystal display element having a liquid crystal display panel integrally formed with the above-mentioned driving circuit. The structure of the liquid crystal display panel of this type is shown in FIGS. 1 and 2.

The panel has two glass substrates 1 and 5. On one glass substrate 1 are formed pixel electrodes 2, thin film transistors 3 connected to the respective pixel electrodes 2, and gate lines $G_1$ to $G_m$ and drain lines $D_1$ to $D_n$ connected to the transistors 3. An aligning film 4 is formed on the pixel electrodes 2 and the transistors 3. On the other glass substrate 5 is formed a transparent common electrode 6 which is covered with an aligning film 7. Both glass substrates 1 and 5 are arranged to face each other and are fixed by means of a seal member 8. Liquid crystal 9 is filled in the space defined between both glass substrates 1 and 5 through a hole 10. After filling the liquid crystal 9 the hole 10 is sealed by a seal member 11 so that the liquid crystal 9 is kept in the space between the opposed glass substrates 1 and 5. Each pixel is constituted by one of the pixel electrodes 2, the portion of the common electrode 6 which faces the same and the portion of the liquid crystal 9 which is disposed therebetween in such a manner that a plurality of pixels similarly formed are arranged in a matrix form.

A driving circuit comprises drain line driving circuits 12 for supplying data signals to the pixel electrodes 2 and gate line driving circuits 13 for controlling the thin film transistors associated with the respective pixel electrodes 2 in response to image data to be displayed. Each of the drain line driving circuits 12 and the gate line driving circuits 13 comprises an integrated circuit including a plurality of thin film transistors directly formed on a substrate. The driving circuits 12 and 13 are arranged on the peripheral portions of the glass substrate 1 disposed outside of the seal member 8. The output terminals of the driving circuits 12 and 13 are connected to the drain lines $D_1$ to $D_n$ and the gate lines $G_1$ to $G_m$, respectively. The drain line driving circuits 12 and the gate line driving circuits 13 are connected to signal lines 14 which supply control signals and image data signals and are also connected to a terminal 15 provided on the glass substrate 1.

Image data signal and control signals such as clock signals are input to the liquid crystal display device of the active matrix type. The gate signals produced by the gate line driving circuits 13 are supplied to the gate lines $G_1$ to $G_m$ in succession and each gate signal selects the corresponding one of the gate lines $G_1$ to $G_m$. The data signals produced by the drain line driving circuits 13 in synchronism therewith at the time interval of the selection of the gate lines are supplied to the drain lines $D_1$ to $D_n$.

The transistors 3, which are connected to one gate line selected by the gate signal, turn on. Each data signal is supplied to the pixel electrode through the turned-on transistors 3. An electric field is produced between the pixel electrode 2 to which the gate signal is supplied and the common electrode 6 to which a common signal is supplied. The liquid crystal 9 disposed between both electrodes 2 and 6 is made active by means of the electric field so as to display image data.

Since the driving circuit is integrally formed with the liquid crystal display panel in the liquid crystal display device as explained above, the display device is made small in size. No process is required to connect the driving circuit to the panel by means of lead wires or the like, leading to a simplified manufacturing process.

However, the above-mentioned driving circuit is mounted on the portions of the liquid crystal panel which is disposed outside of the seal member 8. Thus, the outer peripheral portions of the substrate require a large area. In other words, the liquid crystal display panel has a large peripheral area which is not associated with the image display and this peripheral are surrounds the display area in which the pixels are arranged in a matrix form and which is effective for image display. Accordingly, this liquid crystal display device has a problem in that it requires a large area.

The object of this invention is to provide a small sized liquid crystal display device which overcomes the problems as mentioned above.

SUMMARY OF THE INVENTION

In order to attain the object of this invention, a liquid crystal display device comprises: a first substrate; at least one first electrode formed on the first substrate; a second substrate disposed opposed to said first substrate so as to be separated therefrom at a predetermined distance; a plurality of second electrodes formed on the second substrate so as to be opposed to the first electrode and forming a display region which surrounds the plural second electrodes and is elective for displaying an image; signal supplying leads for supplying driving signals to the second electrodes, the signal supplying leads being formed on the second substrate and being electrically connected to the respective second electrodes; a seal member surrounding the display region between the first and second substrates and connecting together the opposed first and second substrates; a driving circuit electrically connected to the signal supplying leads and provided between the outer edges of the seal member and the outer edges of the display region, for generating a driving signal and selectively supplying the driving signal to the signal supplying leads in response to externally provided input image display data; and a liquid crystal material sealed in a space surrounded by the first and second substrates and the seal member.

In the liquid crystal display device according to this invention, the driving circuit for driving the pixels arranged in a matrix form comprises a plurality of thin film transistors and is mounted on the region of the first substrate which includes portions on which the seal member is provided and portions thereof between the outer edges of the display region and the inner edges of the seal member, which latter portions are left as a region in which the liquid crystal is not uniformly aligned because the distances between the first and second substrates are liable to be uneven there. In this structure, it is unnecessary to provide the outer peripheral region on the first substrate so as to mount the driving circuit thereon. As a result, the liquid crystal display device can be miniaturized.

Since the driving circuit for supplying driving signals to the drain lines and the gate lines is provided on the inner side of the outer edges of the seal member, the gate lines and the drain lines can be shortened so that the resistances of the lines ar lowered and the potential drops of the gate lines and the drain lines are reduced. Accordingly, the display can be made evenly throughout the display region.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

This invention will be explained by way of preferred embodiments with reference to the accompanying drawings.

Figure 1:
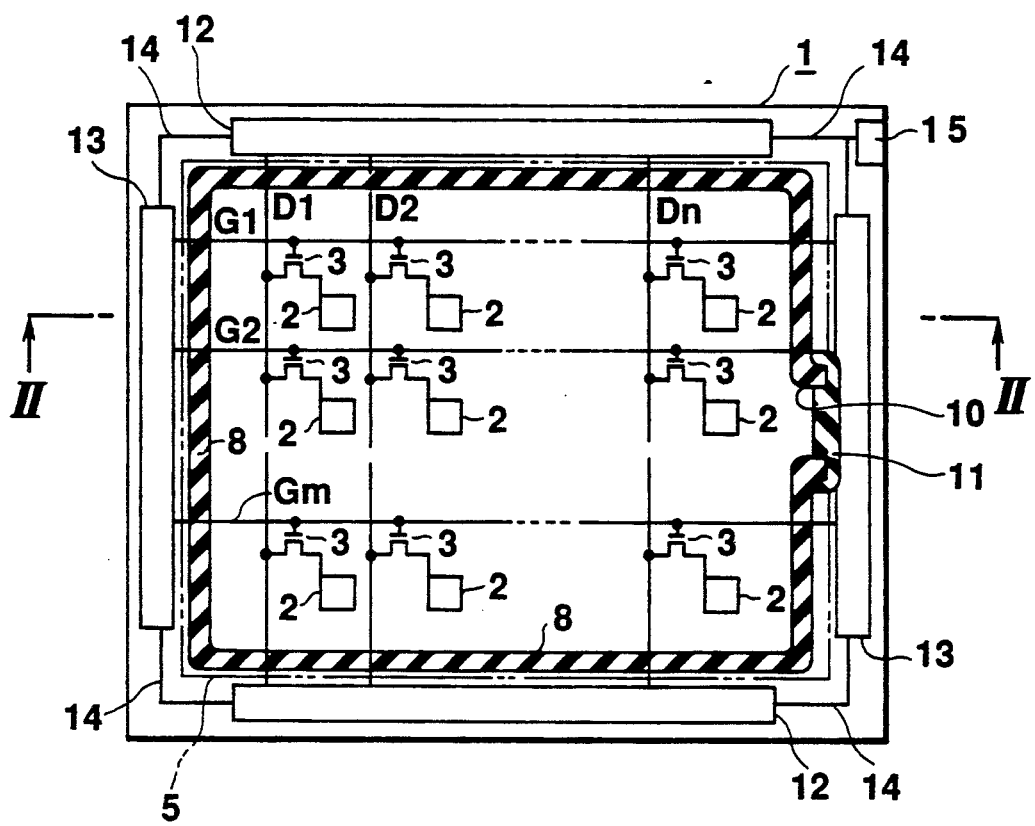
FIG. 1 is a general plan view illustrating the structure of a conventional liquid crystal display device having a driving circuit.
Figure 2:
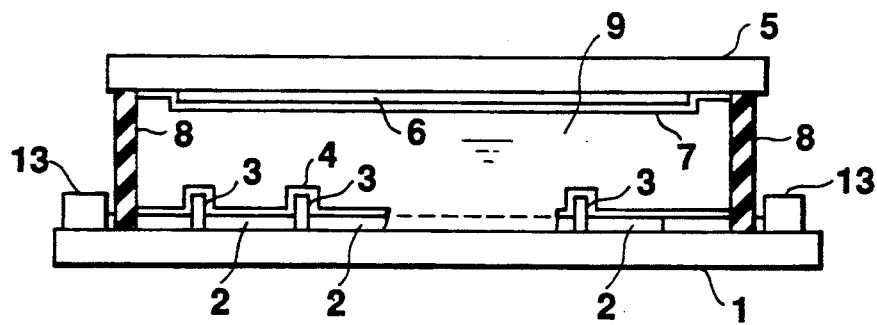
FIG. 2 is a cross-sectional view along line II—II of FIG. 1.
Figure 3:
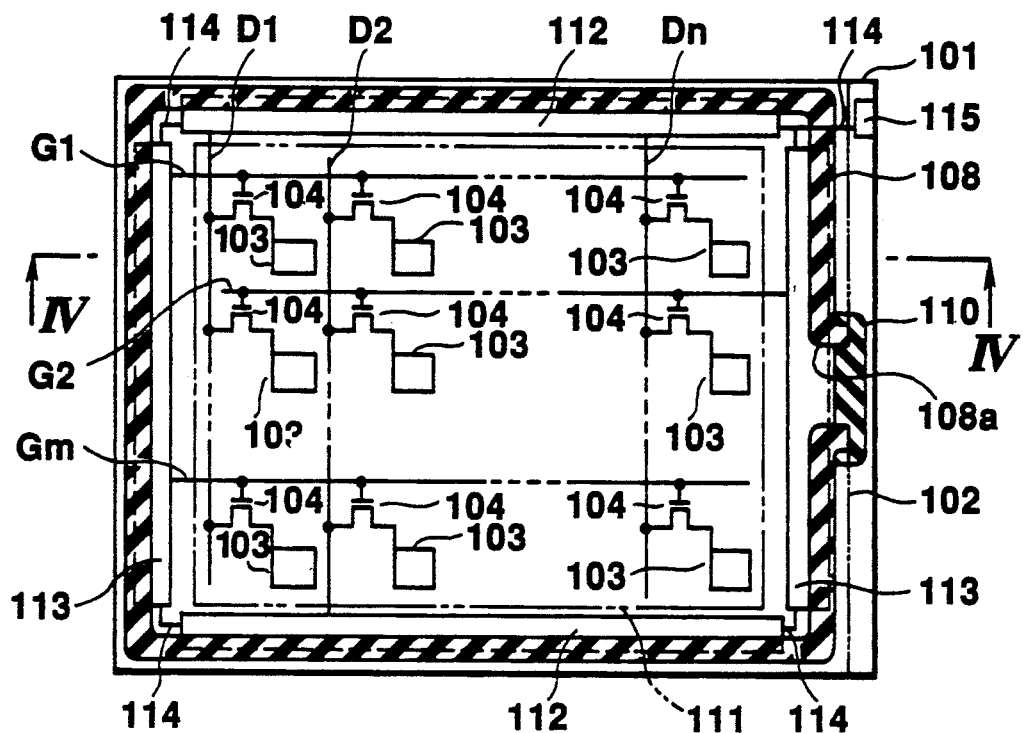
FIG. 3 is a general plan view illustrating the structure of a liquid crystal display element according to an embodiment of this invention.
Figure 4:
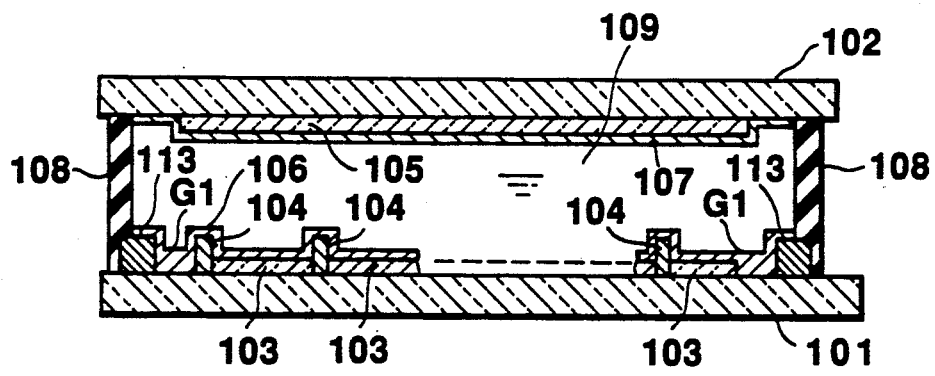
FIG. 4 is a cross-sectional view along line IV—IV of FIG. 3.
Figure 6:
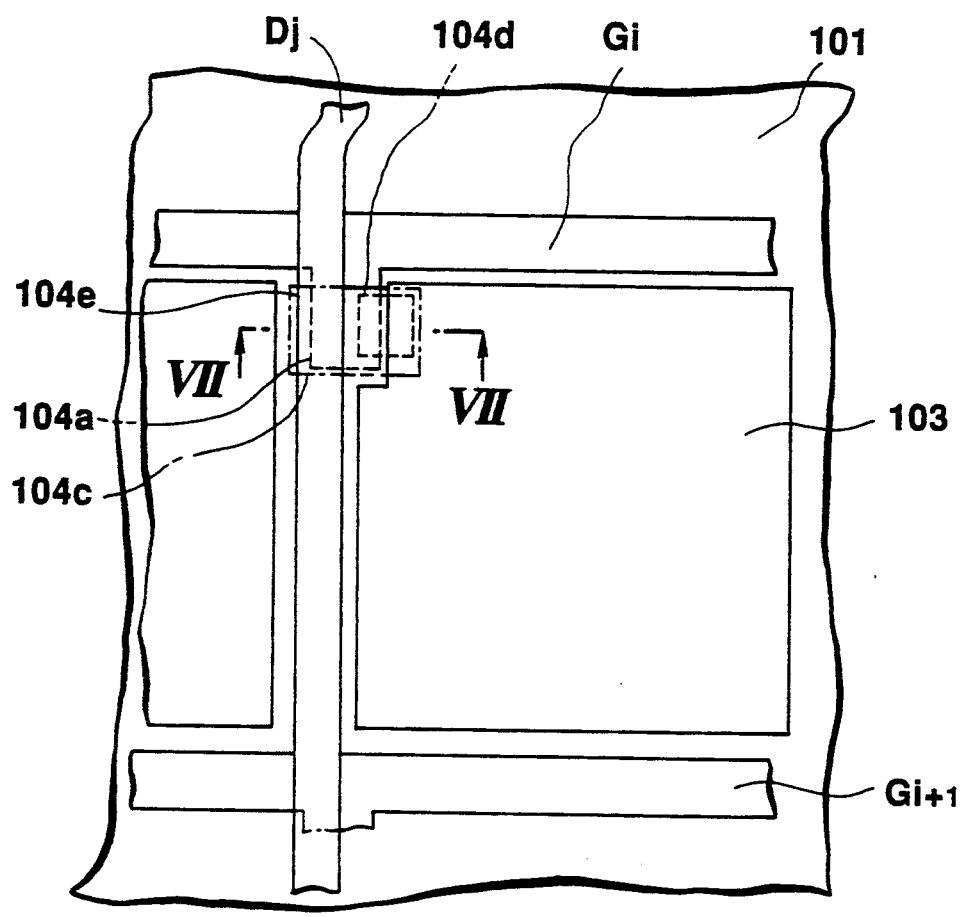
FIG. 6 is an enlarged plan view of a pixel portion of the liquid crystal display device of FIG. 3 when TFD are used as active elements.
Figure 7:
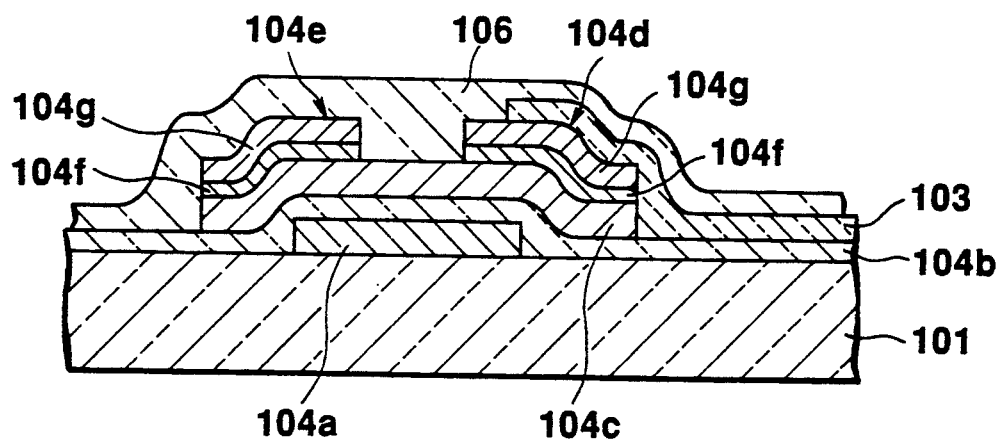
FIG. 7 is a cross-section view along line VII—VII of FIG. 6.

In FIGS. 3 and 4 are provided a pair of transparent substrates 101 and 102 made of glass, quartz or the like. On one surface of the substrate 101 (the lower substrate in FIG. 4) are arranged a plurality of pixel electrodes 103 for display and thin film transistors for pixels (hereinafter referred to as "TFTs"), each of which is connected to the respective pixel electrode 103 and selectively drives the same so that the electrodes 103 and the TFTs 104 are arranged in a matrix form. As shown in FIGS. 6 and 7, the TFT 104 comprises a gate electrode 104a, a gate insulating film 104b, a semiconductor film 104c made of amorphous silicon or polysilicon, a source electrode 104d and a drain electrode 104e so that they are laminated and a channel portion is formed in the upper surface of the resultant lamination. Each of the source electrode 104d and the drain electrode 104e comprises an n+ semiconductor film 104f and a contact metal film 104g. The pixel electrode 103 is connected to the source electrode 104d of the TFT 104. A plurality of gate lines $G_1$ to $G_m$ and a plurality of data lines $D_1$ are formed on the surface of the substrate 101 so as to intersect at right angles with each other. The gate lines $G_1$ to $G_n$ are connected to the gate electrodes 104a of the respective TFTs 104, and the data lines $D_1$ are connected to the drain electrodes 104e of the respective TFTs 104. An aligning film 106 is formed on the TFTs 104.

On one surface of the other substrate 102 (the upper substrate in FIG. 4) is formed an opposed electrode 105. This opposed electrode 105 is integrally formed to oppose all of the pixel electrodes 103 or is formed into a plurality of divided sections to oppose the pixel electrodes 103 arranged in at least one row direction. Aligning films 107 are formed on the surfaces of the substrates 102 on which the opposed electrodes 105 are formed. The paired substrates 101 and 102 are firmly connected together by means of a seal member 108 having an hole 108a so that the surfaces of both substrates 101 and 102 on which the electrodes are formed face each other. Liquid crystal 109 is filled through the hole 108a in a space defined between the substrates 101 and 102 and is sealed by a seal member 110.

In such a way, a pixel is formed by a pixel electrode 103, the portion of the electrode 105 which faces the pixel electrode 103 and the portion of the liquid crystal 109 disposed between the electrodes 103 and 105. A plurality of the pixels having the same structure are arranged in a matrix form to form a display region 111 for displaying a required image.

A driving circuit is provided between the outer edges of the display region defined between the substrates 101 and 102 and the outer edges of the seal member 108. In this arrangement, the driving circuit is provided with drain line driving circuits 112 for supplying data signals to the pixel electrodes 103 and gate line driving circuits 113 for controlling the TFTs 104, each of which is provided for the respective pixel electrode 103.

Each of the drain line driving circuits 112 and the gate line driving circuit 113 comprises an integrated circuit which has a plurality of thin film transistors made of amorphous silicon or a polysilicon semiconductor material. Each of the drain line driving circuit 112 and the gate line driving circuit 113 has an outer edge overlapped with the seal member 108 and has an inner edge extending in the region in which the liquid crystal 109 is sealed.

In the drain lines $D_1$ to $D_n$, the odd numbered drain lines are connected to the upper drain line driving circuit 112 provided above the substrate 101, and the even numbered drain lines are connected to the lower drain line driving circuit 112 on the substrate 101. In the gate lines $G_1$ to $G_m$, the odd numbered gate lines are connected to the gate line driving circuit 113 disposed at the left side portion of the substrate 101, and the even numbered gate lines are connected to the gate line driving circuit 113 disposed at the right side portion of the substrate 101. The drain line driving circuits 112 and the gate line driving circuits 113 are connected together by means of signal lines 114 for supplying control signals, data signals and the like. The signal lines 114 are connected to a terminal 115 through which the control signals, the image data signals and the like are supplied to the driving circuits 112 and 113 from the signal supplying device provided outside of the display device.

Figure 5:
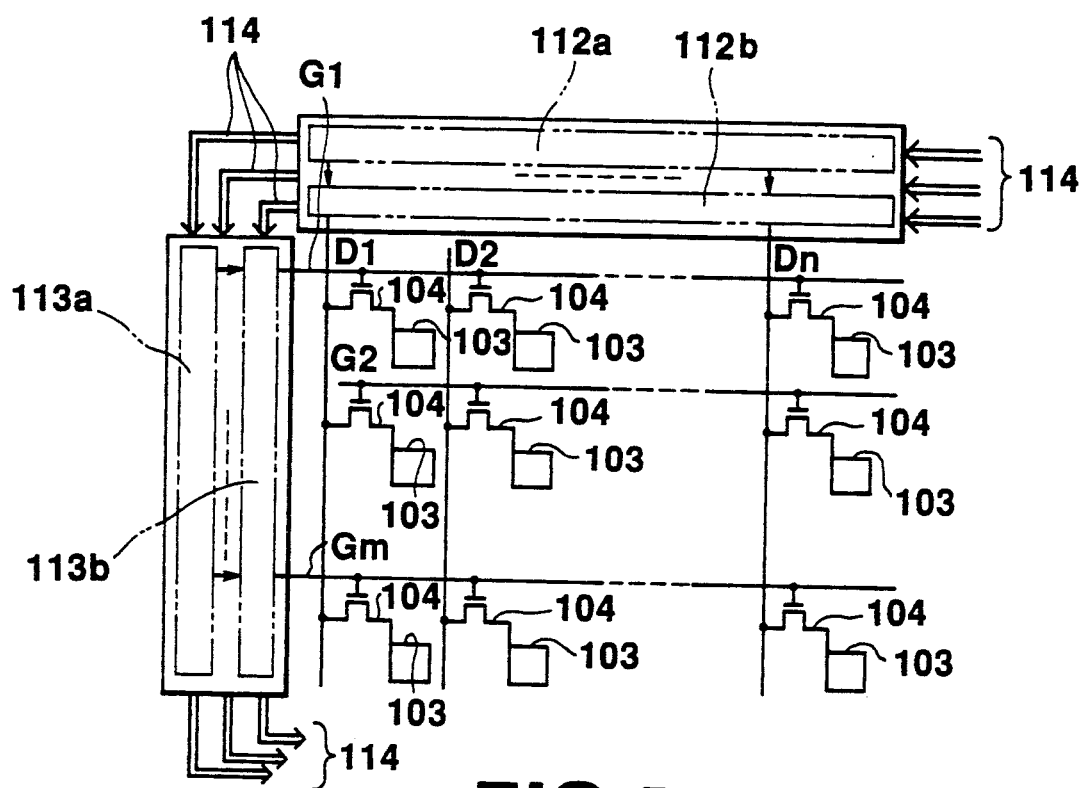
FIG. 5 is a block diagram of a driving circuit for the liquid crystal display device of FIG. 3.

As shown in FIG. 5, the drain line driving circuit 112 comprises a data latch circuit 112a having shift registers or the like for memorizing, in turn, every other image data signals supplied from the signal lines 114, and a data signal generating circuit 112b connected to the data latch circuit 112a, for outputting a required voltage signal to the corresponding data line in response to a supplied clock signal when a latched data signal is output. The gate line driving circuit 113 comprises a circulating memory circuit 113a for circulating a data in the shift registers in response to the supplied clock signal, and a gate signal generating circuit 113b for generating gate signals for selecting every other gate lines in response to the outputs from the circulating memory circuit 113a.

In the liquid crystal display device of an active matrix type according to this invention, image data signal, clock signals and the like are transmitted from the terminal 115 to the drain line driving circuits 121 and the gate line driving circuits 113 through the signal lines 114. The gate line driving circuits 113 provided at both sides of the substrate 101 alternately generate gate signals and supply them to the gate lines $G_1$ to $G_m$ so that one of the gate lines is selected in response to the corresponding one of the gate signals. At the time interval of the selection of the gate line, the transistors 104 connected to the selected gate line are turned on. A data signal produced in synchronism with the gate signals by the drain line driving circuits 112 is supplied to the drain lines $D_1$ to $D_n$, with the result that the data signal supplied to the drain line is supplied to the pixel electrode 103. As a common signal is applied to the opposed electrode 105, an electric field is produced between the opposed electrode 105 and acts on the portion of the liquid crystal 109 between both electrodes 103 and 105 so that this portion of the liquid crystal displays image data is displayed.

In the above mentioned embodiment, the drain line driving circuits 112 and the gate line driving circuit 113 are disposed in portions defined between the outer edges of the seal member 108 and the outer edges of the display region 111 between the substrates 101 and 102.

When the substrates 101, 102 are connected to each other through the seal member 108 in the conventional device, stress is concentrated on a portion near to the seal member 108 of the substrates 101, 102 so that a strain is produced at the portion. Therefore, the gap between the opposed substrates 101, 102 becomes non-uniform, and a portion near to the seal member 108 and located inside of the seal member 108 becomes a blank region.

The liquid crystal display device according to this invention uses this unusable region very effectively in comparison with the conventional device. A driving circuit assembly (hereinafter referred to as only the "driving circuit") comprising the drain line driving circuits 112 and the gate line driving circuits 113 is provided on the conventionally unusable portion of the substrate 101. In this connection, it is necessary to provide any driving circuits on the outside region of the seal member. This structure renders the outer dimension of the substrate 101 small, resulting in the miniaturizing of the liquid crystal display device.

Further, the drain line driving circuits 112 and the gate line driving circuit 113 are disposed within the region defined within inner edges of seal member 108. This structure shortens the length of the gate lines $G_1$ to $G_m$ and the drain lines $D_1$ to $D_n$ so as to reduce the wiring resistances and thus lower the potential drops of the gate lines $G_1$ to $G_m$. This enables the display device to exhibit a uniform display over the whole display region.

Figure 8:
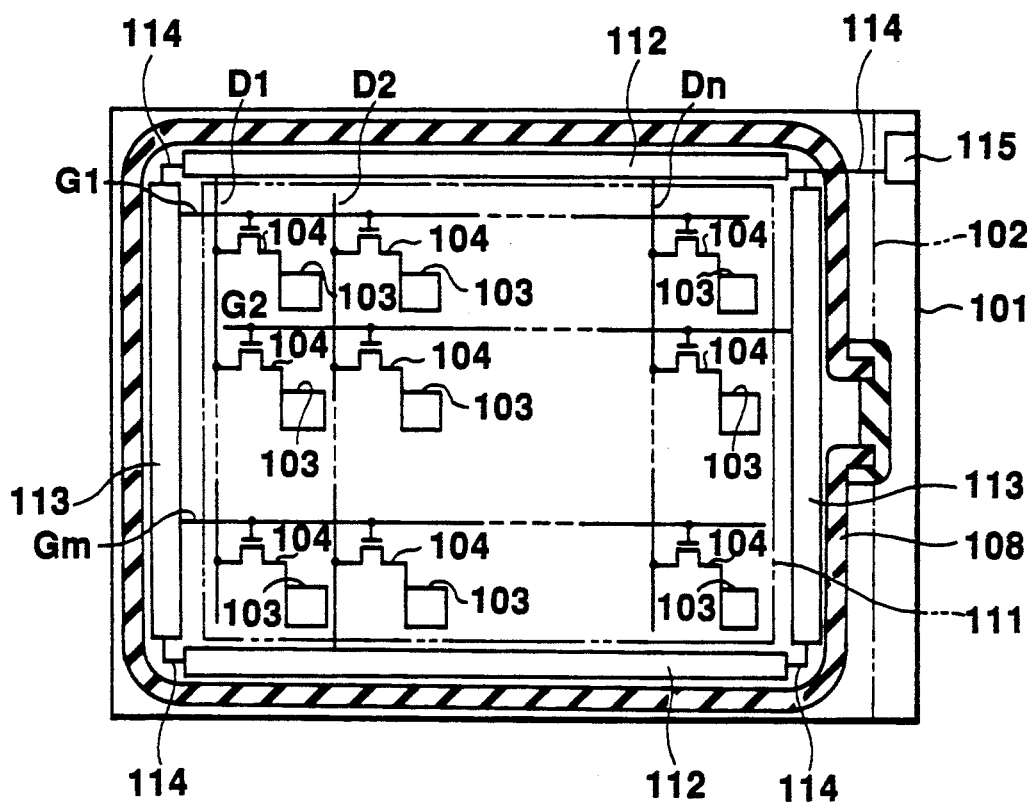
FIG. 8 is a general plan view of a liquid crystal display device according to another embodiment of this invention.

FIG. 8 shows a second embodiment according to this invention in which the same members as those of the embodiment of FIG. 3 are designated by the same referential numerals, the description thereof being omitted. In the second embodiment, a driving circuit comprising a drain line driving circuit 112 and a gate line driving circuit 113 are provided between the outer edges of a display region 111 of a substrate 101 and the inner edges of a seal member 108. In other words, the driving circuit is disposed outside of the display region 101 and at the region where the driving circuit does not overlap with the seal member 108. Since the seal member 108 is directly fixed to the substrate 101 and a substrate 102, the adhesive force is rendered large, thereby firmly connecting both substrates together. No stresses are applied to the driving circuit when both substrates are connected together by means of the seal member 108 so that no defects appear in the driving circuit due to the stresses, leading to an improved quality of the liquid crystal display device.

In both embodiments, an active element provided for each pixel and a driving circuit for driving each pixel are thin film transistors each using a polysilicon semiconductor film. Alternatively, it is preferred that the active element be a thin film transistor using amorphous silicon semiconductor films and the driving circuit be an integrated circuit made up of a thin film transistors using polysilicon semiconductor films.

The active element of the liquid crystal display device is not limited to a TFT but may be a non-linear resistance element such as a diode using a thin film semiconductor (hereinafter referred to as the "TFD"). The structure of a liquid crystal device using a TFD is shown in FIGS. 9 and 10.

Figure 9:
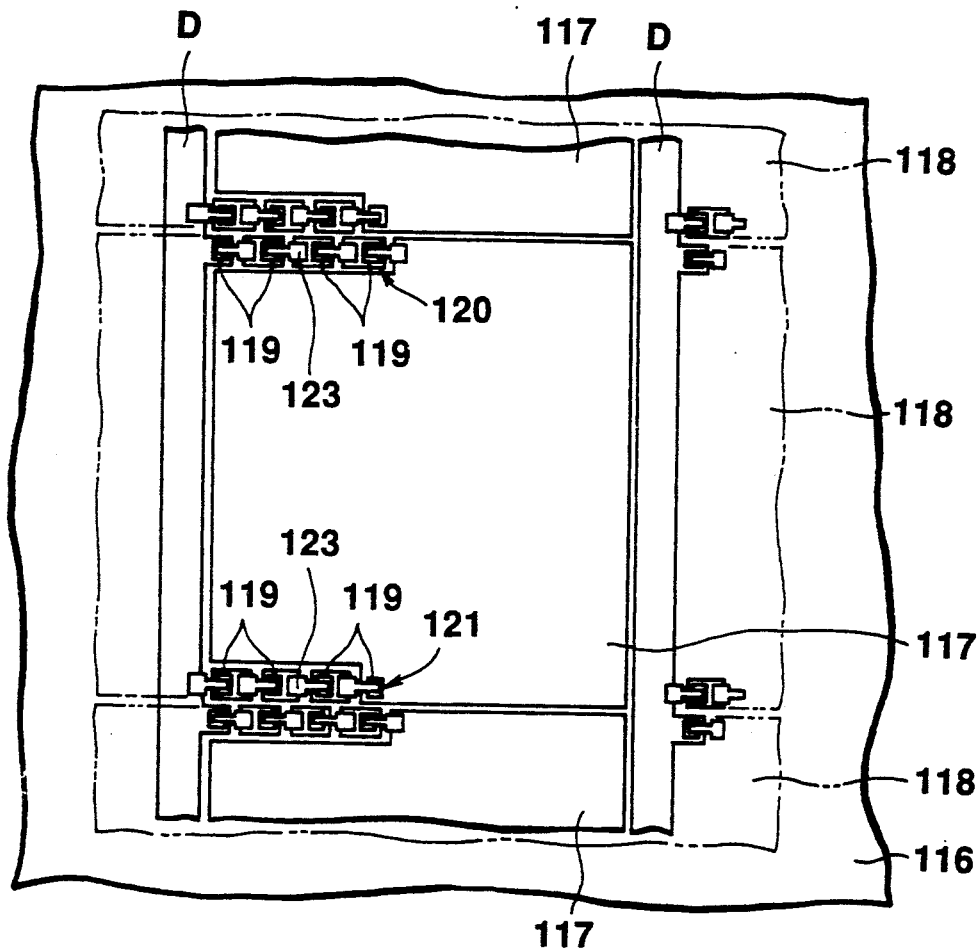
FIG. 9 is an enlarged plan view of a pixel portion of FIG. 8 when TFDs are used as active elements.

In FIG. 9, a plurality of pixel electrodes 117 are arranged on a substrate 116 in a matrix form. Between the pixel electrodes 117 arranged in columns are provided data lines D extending along the corresponding columns. The pixel electrodes 117 and the data lines D are forwardly connected in series by means of a group of forward biased diodes 120 and reversely connected in series by means of a group of diodes 121 comprising a plurality of reversely biased diodes 119 so as to form so-called diode rings.

Figure 10:
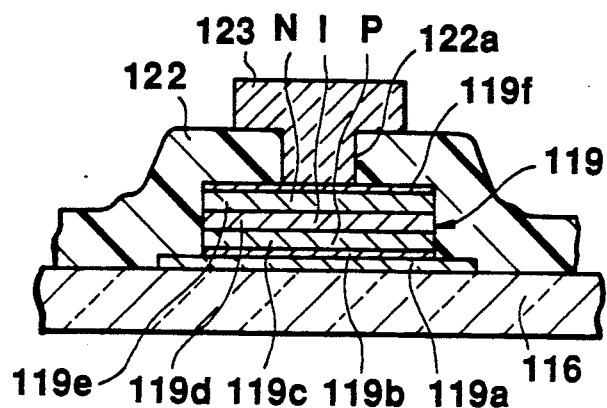
FIG. 10 is a cross-sectional view of one of the TFDs as shown in FIG. 9.

As shown in FIG. 10, each diode 119 is formed on the substrate 116, and comprises an electrically conducting film 119a a contact metal film 119b, a P-type semiconductor 119c, an I-type semiconductor film 119d, an N-type semiconductor film 119e and a contact metal film 119f, superposed on one another on the substrate 116. On the thin film diode 119 is formed an electrically insulting film 122 having a through hole 122a through which an electrically connecting conductor 123 is electrically connected to the contact metal 119f.

The group of the forwardly biased diodes 120 are formed on the extensions from the drain lines D and the electrically conducting films 119a formed separately from each other. Each electrically connecting conductor 123 connects the upper contact metal 119f of the corresponding diode 119 to the electrically conducting film 119a of the adjacent diode 119 and the corresponding pixel electrode 117 to the diode 119 of the corresponding last stage.

The group of reversely biased diodes 121 are formed on parts of pixel electrodes 117 and electrically conducting films 119a formed separately from each other. Each electrically connecting conductor 123 connects the upper contact metal 119f of the corresponding diode 119 to the electrically conducting film 119a of the adjacent diode 119 and the diode 119 of the corresponding last stage to the corresponding drain line D.

In the liquid crystal optical element using the TFDs, voltages are selectively impressed between the pixel electrode 117 and an opposed electrodes 118 which are arranged on an another substrate (not shown) facing the same so as to intersect with the drain lines D at right angles in such a manner that the transmittance of each pixel is controlled so that a required image is displayed.

Needless to say, the liquid crystal display device is not limited to the device of the active matrix type but may be a liquid crystal display device of a simple matrix type having a pair of opposing substrates formed with electrodes intersecting with each other at right angles. In this case and likewise in the case of the above embodiments, the driving circuit for supplying voltages to the electrodes is disposed between the outer edges of the seal member and outer edges of the display region in which pixels comprising intersecting electrodes and liquid crystal interposed between the electrodes are formed in a matrix form.

In the above-mentioned embodiments, the driving circuit is distributed to the four side edge portions of the electrodes, and every other lines of the data lines and the drain lines are driven. However, a single data line driving circuit may be formed on either the upper (in the drawings) edge portion or the lower (in the drawings) edge portion of the substrates, and a single gate line driving circuit may be formed on either the left edge portion or the right edge portion of the substrates so that the data lines and the gate lines are driven by the single data line driving circuit and the single gate line driving line circuit respectively.

Figure 11:
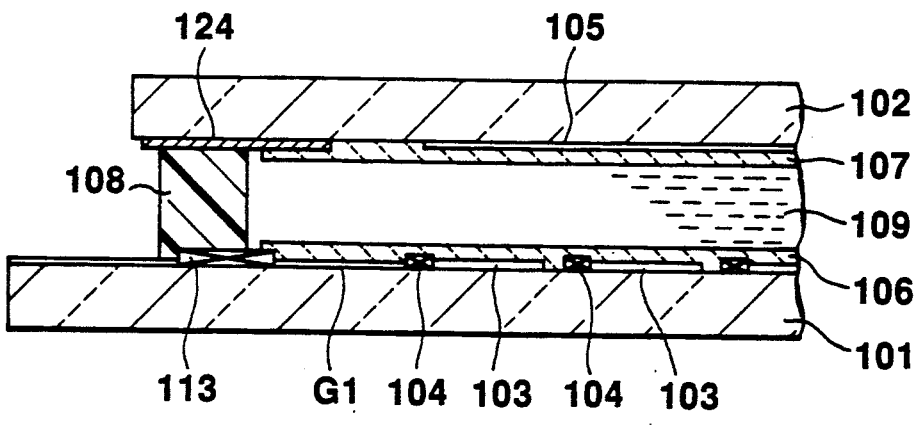
FIG. 11 is a cross-sectional view of a main part of a liquid crystal display device of a further embodiment of this invention.

FIG. 11 shows a third embodiment according to this invention, in which means for preventing light from being emitted on the driving circuit is provided so that the thin film transistors do not function erroneously. The structure of the third embodiment will now be described. The same parts of the third embodiment as those of the other embodiments are denoted by the same referential numerals, the description thereof being omitted.

As shown in FIG. 11, the liquid crystal display element has a lower substrate 101 having formed thereon a driving circuit including gate line driving circuits 113 and drain line driving circuits 112, and an upper substrate 102 opposing the substrate 101. The liquid crystal display device is further provided with a shading film 124 made of metal such as chromium. The shading film 124 is formed on that portion of the upper substrate 102 on which the driving circuit on the lower substrate 101 faces, and has such an area as is larger than those of the gate line driving circuit 113 and the drain line driving circuit 112 but does not overlaps the display region of the liquid crystal display element. Accordingly, the shading film 124 prevents light beams from being emitted on the driving circuit so that the driving circuit does not function erroneously due to light beams.

In the third embodiment, the driving circuit is disposed such that its outer edges are disposed within the portions of the width of the seal member 108 and its inner edges are positioned between the inner edges of the seal member 108 and the extreme outer edge portions of the liquid crystal sealed region. However, the overall driving circuit may be disposed on such the outer peripheral portions of the liquid crystal sealed portion as are not used as part of the display region. Further, the overall driving circuit may be placed in or within the portions of the width of the seal member 108 by fully widening the seal member 108. In the latter alternative case, the seal member 108 may be made of transparent resin so as to act also as a shading film and the shading film 124 formed on the upper substrate 102 may be omitted.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A liquid crystal display device comprising:
   a first substrate comprising a transparent material;
   a common electrode formed on said first substrate;
   a second substrate arranged parallel to said first substrate and spaced apart from said first substrate by a predetermined distance;
   a plurality of pixel electrodes formed on said second substrate for defining a display region opposing said common electrode;
   signal supplying leads electrically coupled to said pixel electrodes, for supplying a driving signal thereto;
   a seal member, formed between said first and second substrates at a peripheral portion surrounding said display region, for fixing said first and second substrates together;
   a driving circuit, formed between an outer edge of said display region and an outer edge of said seal member and electrically connected to said signal supplying leads, for supplying a driving signal to said pixel electrodes through said signal supplying leads in response to externally input display data; and
   a liquid crystal material sealed in an internal space defined by said first and second substrates and said seal member, said liquid crystal material surrounding at least a portion of said driving circuit.

2. A liquid crystal display device according to claim 1, wherein said driving circuit comprises an integrated circuit formed on said second substrate and including a plurality of thin film transistors.

3. A liquid crystal display device according to claim 2, wherein each of said thin film transistors comprises a thin film semiconductor of polysilicon.

4. A liquid crystal display device according to claim 2, wherein each of said thin film transistors comprises a thin film transistor of amorphous silicon.

5. A liquid crystal display device comprising:
a first substrate comprising a transparent material;
a common electrode formed on said first substrate;
a second substrate arranged parallel to said first substrate and spaced apart from said first substrate by a predetermined distance;
a plurality of row lines arranged on said second substrate and extending in a given direction;
a plurality of column lines arranged on said second substrate and extending in a direction transverse to said given direction in which said row lines extend;
a plurality of active elements, each including a thin semiconductor and a pixel electrode, and each being disposed at an intersection of said row and column lines, said plurality of active elements defining a display region opposing said common electrode;
a seal member, formed between said first and second substrates at a peripheral portion surrounding said display region, for fixing said first and second substrates together;
a row line driving circuit formed on said second substrate and electrically coupled to said plurality of active elements through said row lines;
a column line driving circuit formed on said second substrate and electrically coupled to said plurlatiy of active elements through said column lines; and
a liquid crystal material filled in an internal space defined by said first and second substrates and said seal member, said liquid crystal material surrounding at least a portion of said row and column driving circuits.

6. A liquid crystal display device according to claim 5, wherein each of said plurality of active elements comprises a thin film transistor including a source electrode, a drain electrode, a gate insulating film respectively formed on said semiconductor and a gate electrode formed on said gate insulating film, which are laminated on said second substrate.

7. A liquid crystal display device according to claim 6, further comprising a shielding film made of light shielding material and formed on a portion of said second substrate so as to cover at least one of said row line and column line driving circuits.

8. A liquid crystal display device according to claim 5, wherein each of said plurality of active elements comprises a non-linear resistance element having thin films laminated on said second substrate.

9. A liquid crystal display device according to claim 8, wherein said non-linear resistance element comprises a thin film diode.

10. A liquid crystal display device according to claim 5, wherein each of said plurality of active elements comprises a thin film transistor including semiconductor films comprising thin amorphous silicon films formed on said second substrate, and wherein said row line and column line driving circuits comprise an integrated circuit comprising a plurality of thin film transistors using thin polysilicon films.

11. A liquid crystal display device according to claim 5, wherein each of said plurality of active elements comprises a thin film transistor including semiconductor films comprising thin polysilicon films formed on said second substrate, and wherein said row line and column line driving circuits comprise an integrated circuit comprising a plurality of thin film transistors including thin polysilicon films.

* * * * *